(12) United States Patent
Warrier et al.

(10) Patent No.: US 9,401,524 B2
(45) Date of Patent: Jul. 26, 2016

(54) COMPLIANT STACK FOR A PLANAR SOLID OXIDE FUEL CELL

(75) Inventors: Sunil G. Warrier, Middletown, CT (US); Jean Yamanis, Glastonbury, CT (US); James R. Maus, Old Saybrook, CT (US); Benoit Olsommer, South Glastonbury, CT (US)

(73) Assignee: Ballard Power Systems Inc., Burnaby (CA)

( * ) Notice: Subject to any disclaimer, the term of this patent is extended or adjusted under 35 U.S.C. 154(b) by 1975 days.

(21) Appl. No.: 10/577,754

(22) PCT Filed: Sep. 29, 2004

(86) PCT No.: PCT/US2004/032038
§ 371 (c)(1),
(2), (4) Date: Apr. 27, 2006

(87) PCT Pub. No.: WO2005/034277
PCT Pub. Date: Apr. 14, 2005

(65) Prior Publication Data
US 2006/0210858 A1    Sep. 21, 2006

Related U.S. Application Data

(60) Provisional application No. 60/506,936, filed on Sep. 29, 2003.

(51) Int. Cl.
*H01M 8/00* (2006.01)
*H01M 8/24* (2016.01)
*H01M 8/02* (2016.01)

(52) U.S. Cl.
CPC ............ *H01M 8/242* (2013.01); *H01M 8/0271* (2013.01); *H01M 8/0273* (2013.01); *H01M 8/2425* (2013.01); *Y02E 60/50* (2013.01)

(58) Field of Classification Search
CPC ........................................................ H01M 8/00
USPC ............................................................ 429/38
See application file for complete search history.

(56) References Cited

U.S. PATENT DOCUMENTS 5,238,754 A * 8/1993 Yasuo et al. .................... 429/30
5,312,700 A 5/1994 Ishida
(Continued)

FOREIGN PATENT DOCUMENTS

EP    0 750 798 A    1/1997
JP    H03149759 A    6/1991
(Continued)

OTHER PUBLICATIONS

Chinese Office Action Dated Aug. 17, 2007, for Chinese Patent Application No. 2004800346362.
(Continued)

*Primary Examiner* — Jacob Marks
(74) *Attorney, Agent, or Firm* — Seed IP Law Group PLLC

(57) ABSTRACT

A fuel cell stack formed of repeating cell units is provided wherein each cell unit includes a fuel cell having an anode side and a cathode side; an anode side frame; a cathode side frame; a bipolar plate having an anode side interconnect adjacent to the anode side frame and a cathode side interconnect adjacent to a cathode side frame of an adjacent cell unit; a cathode side seal between the fuel cell and the cathode side frame; and an anode side seal between the fuel cell and the anode side frame, wherein at least one of the anode side interconnect, cathode side interconnect, anode side seal and cathode side seal are compliant.

20 Claims, 3 Drawing Sheets

(56) References Cited

U.S. PATENT DOCUMENTS

| | | | |
|---|---|---|---|
| 5,460,897 A | 10/1995 | Gibson et al. | |
| 6,656,625 B1* | 12/2003 | Thompson et al. | 429/465 |
| 6,794,075 B2* | 9/2004 | Steele et al. | 429/30 |
| 7,045,237 B2 | 5/2006 | Sridhar et al. | |
| 7,135,248 B2 | 11/2006 | Finn et al. | |
| 7,144,651 B2 | 12/2006 | Finn et al. | |
| 7,255,956 B2 | 8/2007 | McElroy et al. | |
| 2002/0025458 A1* | 2/2002 | Faville et al. | 429/13 |
| 2003/0096147 A1 | 5/2003 | Badding et al. | |
| 2003/0162067 A1 | 8/2003 | McElroy | |
| 2003/0170527 A1 | 9/2003 | Finn et al. | |
| 2003/0224237 A1* | 12/2003 | Vanderleeden et al. | 429/35 |
| 2003/0224238 A1* | 12/2003 | Finn et al. | 429/35 |
| 2003/0235746 A1 | 12/2003 | Haltiner, Jr. et al. | |
| 2004/0151968 A1 | 8/2004 | Warrier et al. | |
| 2004/0200187 A1 | 10/2004 | Warrier et al. | |

FOREIGN PATENT DOCUMENTS

| | | |
|---|---|---|
| JP | 2001068132 A | 3/2001 |
| WO | 96/17394 A | 6/1996 |
| WO | 03071618 | 8/2003 |

OTHER PUBLICATIONS

Japanese Office Action for Application No. 2006-528328 dated Feb. 17, 2011.

* cited by examiner

COMPLIANT STACK FOR A PLANAR SOLID OXIDE FUEL CELL

CROSS REFERENCE TO PROVISIONAL APPLICATION

This application claims the benefit of provisional application Ser. No. 60/506,936, filed Sep. 29, 2003.

BACKGROUND OF THE INVENTION

The invention relates to planar solid oxide fuel cell stacks and, more particularly, to a planar-solid oxide fuel cell stack design which increases the footprint of the stack.

It is essential from a cost reduction standpoint to increase the footprint of the solid oxide fuel cell (SOFC) stack in the plane of the cell. One approach to achieve increased in-plane footprint is to manufacture and use SOFC cells that are bigger in length and/or width in the stack. Manufacturing ceramic SOFC cells of increased dimensions and maintaining them within acceptable tolerances is fundamentally difficult. At this time, several cell manufacturers produce 4"×4" (10 cm×10 cm) cells within acceptable dimensional tolerances. Cell manufacturers are presently attempting to produce 8"×8" (20 cm×20 cm) cells within acceptable tolerances. Acceptable tolerances are needed to prevent cell fracture during assembly and operation of the stack. Fundamentally, from a ceramics processing standpoint further increases in size are extremely difficult and probably not cost effective. In addition, the use of larger cells raises thermal management concerns during electrochemical operation since the temperature across the cell increases with increasing in-plane cell dimension. Prior art stack designs typically use bonded glass seals and/or non-compliant interconnects and, therefore, are not easily amenable to in-plane foot print scale-up.

It is clear that the need exists for a fuel cell stack structure which reliably provides for in-plane foot print scale up, and it is the primary object of the present invention to provide such a structure.

Other objects and advantages of the invention will appear herein below.

SUMMARY OF THE INVENTION

According to the invention, the foregoing objects and advantages have been readily attained.

According to the invention a fuel cell stack is provided which is formed of repeating cell units, wherein each cell unit comprises: a fuel cell having a trilayer structure of an anode electrode, an electrolyte, and a cathode electrode; an anode side frame; a cathode side frame; a bipolar plate having an anode side interconnect adjacent to the anode side frame and a cathode side interconnect adjacent to a cathode side frame of an adjacent cell unit; a cathode side seal between the fuel cell and the cathode side frame; and an anode side seal between the fuel cell and the anode side frame, wherein at least one of the anode side interconnect, anode side seal, cathode side interconnect, and cathode side seal are compliant, or pairs of anode side interconnect and anode side seal may be compliant and pairs of cathode side interconnect and cathode side seals may be compliant.

According to the present invention, the anode side frame has one or more openings into which are seated one or more fuel cells. Each of these openings includes a groove, or recessed landing, along the perimeter thereof. The anode side seal and fuel cell both seat in the recessed land of the anode frame opening, and the anode electrode of the fuel cell faces the anode seal. The cathode side frame and cathode side seal include one or more openings, these openings being coincident with the openings in the anode side frame.

Use of compliant seals and interconnects allows for a floating fuel cell which is more likely to resist stresses even at large in-plane foot prints, and also allows for avoidance of cell fracture from excessive compressive loads on the cell as well.

BRIEF DESCRIPTION OF THE DRAWINGS

A detailed description of preferred embodiments of the present invention follows, with reference to the attached drawings, wherein.

DETAILED DESCRIPTION

Figure 1:
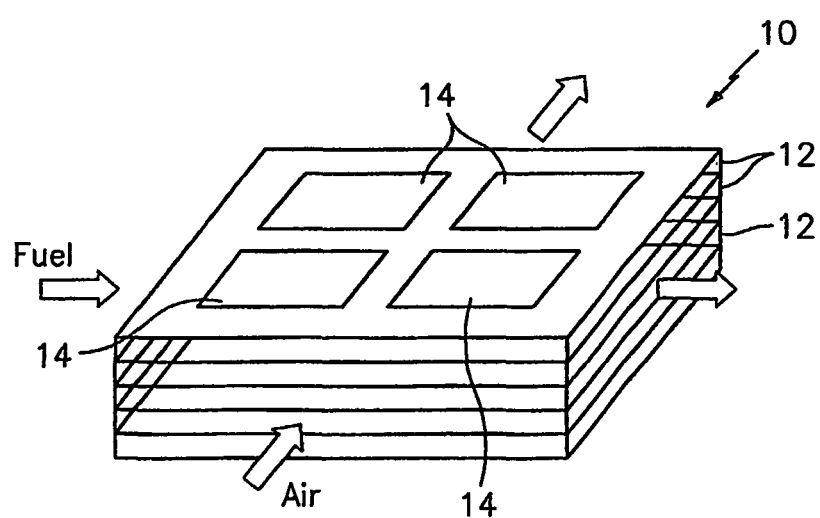
FIG. 1 is a perspective view of a solid oxide fuel cell stack according to the invention.

The invention relates to a fuel cell assembly and, more particularly, to a solid oxide fuel cell (SOFC) stack having improved compliant interconnects and/or seals.

While the 3D compliant stack (i.e., compliant in all three orthogonal axes) of the present invention can inherently tolerate larger cell dimensional variations and thereby allow the use of larger cells of lower dimensional quality than prior art systems, the 3D compliant stack also enables in-plane foot print scale-up in ways not achieved before. The main reason for increased in-plane foot print scale-up capability is that the stack is 3D compliant through at least one of, and preferably all of, compliant interconnects, compliant seals and resulting floating cells. As a result, dimensional variations that exist from one cell to another can be tolerated, because the compliant design limits local bending stresses to avoid fracture of the brittle ceramic cell. Floating, as used herein, means mechanically decoupled so that forces are not transferred from one component to another. For example, floating may be achieved by permitting relative motion between portions of the structure.

In addition, the seals are floating and do not bond to the mating surfaces. As a result, thermal gradients in the cell as well as thermal stresses during transient conditions are accommodated by relative movement, or sliding, in the seal area.

Compliant structures are described in greater detail in commonly assigned U.S. patent application Ser. No. 10/758,843, filed Jan. 16, 2004, and incorporated herein by reference. Compliant seals are further described in commonly assigned U.S. patent application Ser. No. 10/622,881, filed Jul. 18, 2003, and incorporated herein by reference.

This invention provides a stack design having the ability for increased in-plane footprint and thereby enables cost effective scale-up of SOFC stacks. As an added benefit, the stack design permits cooling channels to be built integral to the assembly thereby minimizing thermal gradients across the cell and enhancing stack structural robustness and electrochemical stability.

A fuel cell stack may be formed of repeating cell units, wherein each cell unit comprises: a fuel cell having a trilayer structure of an anode electrode, an electrolyte, and a cathode electrode; an anode side frame; a cathode side frame; a bipolar plate having an anode side interconnect adjacent to the anode side frame and a cathode side interconnect adjacent to a cathode side frame of an adjacent cell unit; a cathode side seal between the fuel cell and the cathode side frame; and an anode side seal between the fuel cell and the anode side frame, wherein at least one of the anode side interconnect, anode side seal, cathode side interconnect, and cathode side seal are compliant, or pairs of anode side interconnect and anode side seal may be compliant and pairs of cathode side interconnect and cathode side seals may be compliant.

According to the present invention, the anode slide frame has one or more openings into which are seated one or more fuel cells. Each of these openings includes a groove, or recessed landing, along the perimeter thereof. The anode side seal and fuel cell seat in the recessed land of the anode frame opening, and the anode electrode of the fuel cell faces the anode seal. The cathode side frame and cathode side seal include one or more openings, these openings being coincident with the openings in the anode side frame.

FIG. 1 shows a cross flow stack 10 consisting of several layers of repeating cell units 12. One plane of stack 10 is shown where four fuel cells 14 are arranged in a substantially square geometry. An anode side frame with four openings (similar to a window frame) supports the four cells at their perimeters. The anode side frame resembles a window frame, wherein each opening has a recessed land or groove along its entire perimeter. The recessed land, which will be referred to as a groove, serves as the seat of one anode side seal, on top of which one fuel cell seats with the anode electrode facing the seal. In this arrangement, the fuel cell resembles a pane of a window.

Figure 2:
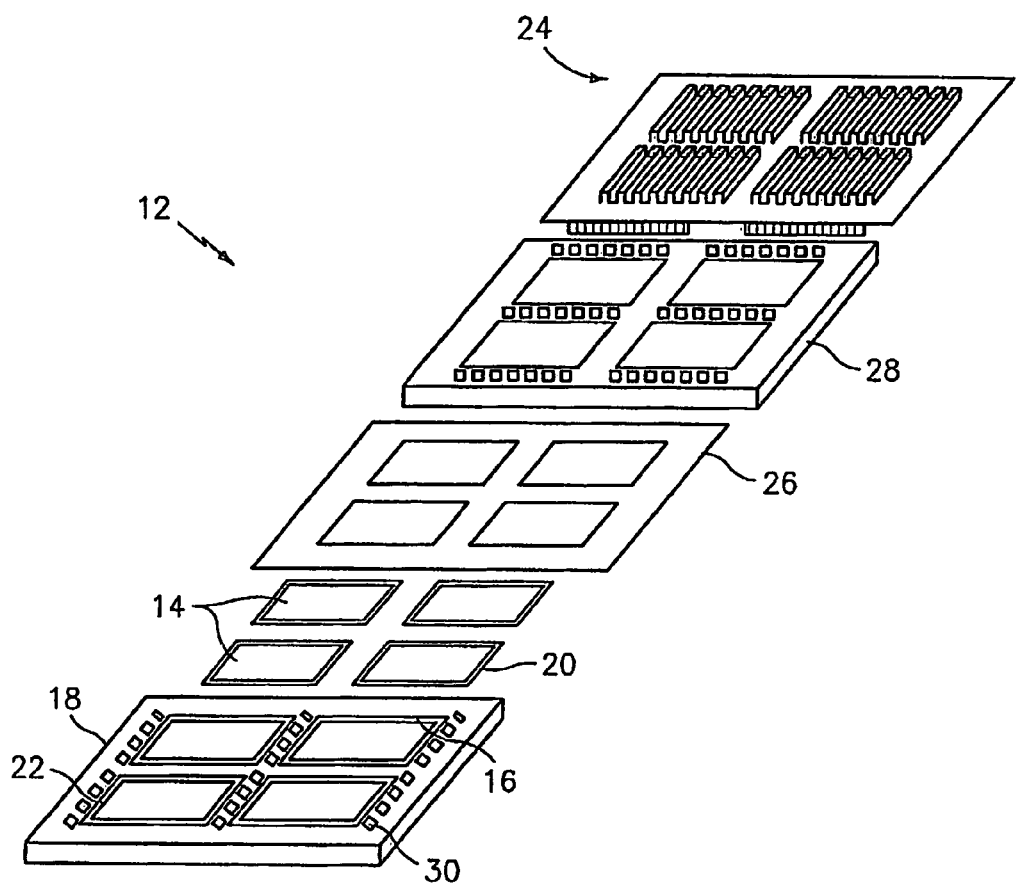
FIG. 2 is an exploded view of a cell stack assembly according to the invention.

FIG. 2 is an expanded view of the repeating cell unit 12 of stack 10. Fuel cells 14 seat in a groove 16 in an anode frame 18 where the anode side 20 of cell 14 is sealed using a compliant seal 22. A 3D compliant bipolar plate 24, compliant cathode seal 26 and cathode frame 28 are assembled as shown in FIG. 2. Since fuel cells 14 are inside groove 16 and sealed using two compliant seals 22, 26, the cells are not subjected to the clamping load normally exerted on the frame and as such the cells are referred to as floating cells. The heights of interconnects, seals, grooves and frame are formed, net-shape processed, or machined to accept a nominal thickness of the cell thickness. The floating cell and the 3D compliance of the seals and interconnects advantageously allows variations in cell thickness and cell curvature to be accommodated without cell damage or fracture.

In the stack assembly process, thin layers of contact or bonding material may be used between the anode electrode of fuel cell 14 and the anode side interconnect so as to improve electron transfer and minimize the interface ohmic resistance. Similarly, thin layers of contact or boding material may be used between the fuel call electrode and cathode side interconnect.

While FIG. 2 shows bipolar plate 24, anode frame 18 and cathode frame 28 as separate parts, for the sake of clarity, these parts can advantageously be bonded together by one of several metal-joining processes well known in the art to form a single part. If bipolar plate 24 and the anode and cathode frames are used as separate parts in assembling a stack, then a flat compliant seal similar to the cathode side seal shown in FIG. 2 may be used between the pairs of anode frame-separator plate and cathode frame-separator plate.

The window-frame stack design shown in FIG. 2 can be manifolded in a number of ways such as 1) external fuel and external air manifold, 2) internal fuel and external air manifold, 3) internal fuel and internal air, and other similar combinations. In the window-frame design the external surfaces of the stack are essentially made up of the shallow external planes of frames and separator plates, which are made of metallic materials. Dimensional control of metallic material parts is much better than ceramic materials and the window-frame stack design would make the application of external fuel and external air manifold possible and the external manifolds may be expected to lead to lower stack costs. FIG. 2 shows slots 30 for gas stream flow across the cells and the stack assuming the stack is externally manifolded. These slots are preferably properly sized for flow control across a cell plane and between cell planes.

Figure 3:
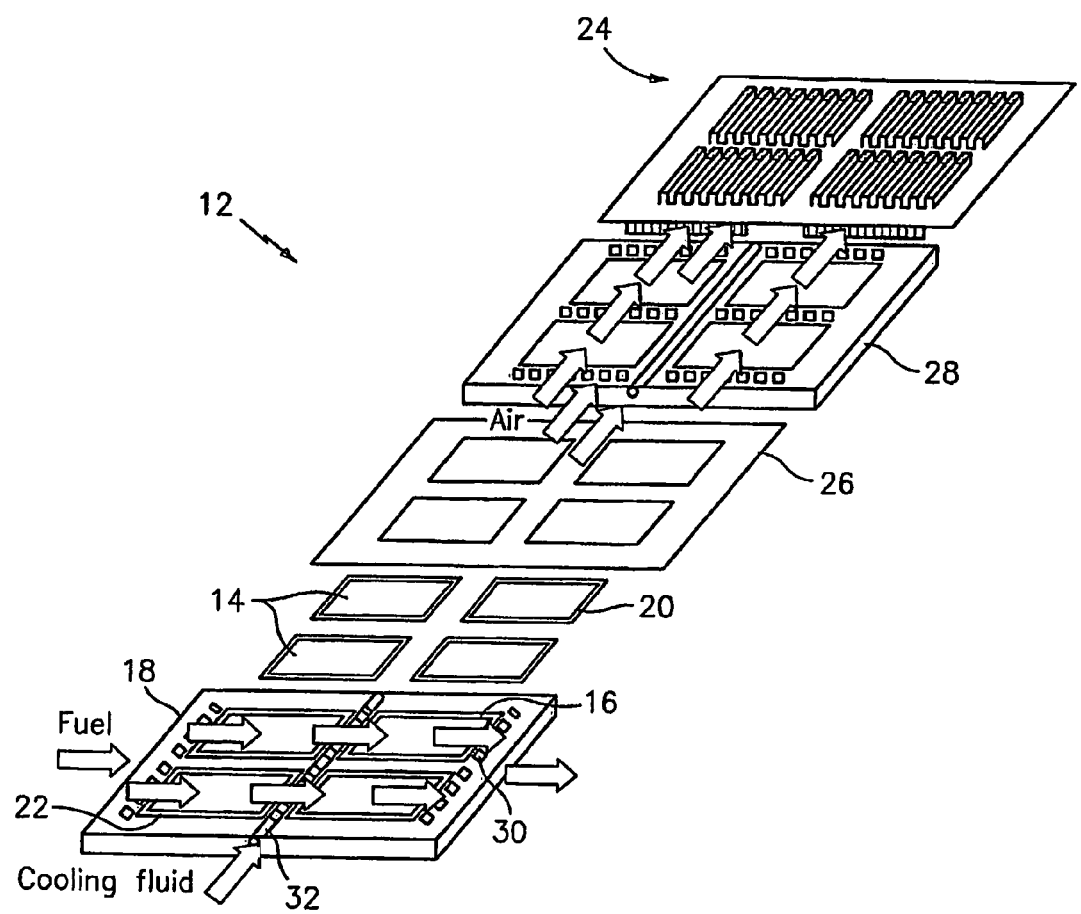
FIG. 3 is an exploded view of an alternative embodiment of a cell stack assembly according to the invention.

FIG. 3 shows the use of channels 32 formed into the anode and cathode frames to bring in and take out cooling fluids. These cooling fluids may be air, fuel, water vapor, helium, liquid metals, or any other medium that accomplished the function of cooling the stack. In one example, endothermic processes such as fuel reforming may be done in these channels. These fluid channels may be used to integrate the stack with combined heat and power (CHP), numerous bottoming cycles or other thermal management integration options. These channels can be manifolded using means commonly known to the industry. Those skilled in the art will realize numerous alternate ways to arrange the flow fields of the reactants as well as the cooling fluid. These commonly known alternate methods are within the scope of the invention.

The stack in-plane foot print and the fuel cells are illustrated in the figures and described in the example as of a substantially square, '2×2' array, geometry. It will be understood by those skilled in the art that the fuel cell arrangement in a window frame architecture can be a 'M×N' array, wherein 'M' fuel cells are disposed in one direction and 'N' fuel cells are disposed in a substantially orthogonal direction and all the space is filled.

In another embodiment, the stack may have an in-plane foot print geometry that is rectangular (as with a 4×2 cell arrangement). In another embodiment, the stack consists of rectangular cells arranged in an equal matrix (e.g. 4×4) or non-equal matrix (e.g. 4×2). In another embodiment, the stack may have a substantially circular or oval in-plane foot print and may use substantially circular or oval shaped cells. Although 4×4 and 4×2 matrices are used as examples, the in-plane foot print may be of any number of cells. Those skilled in the art will realize numerous alternate ways to arrange the cells and the in-plane footprint. These commonly known alternate methods are also covered by the invention.

The invention disclosed herein may serve to reduce stack cost, permit multiple cells to be assembled to increase stack in-plane foot print using a window frame type architecture, permit flow of cooling fluids to mitigate thermal gradients and manage thermals across the in-plane footprint. The planar SOFC stack design disclosed in this invention enables the fabrication of larger name plate capacity stacks and leads to the assembly of large capacity integrated energy systems such as cooling heat and power (CHP) products for commercial buildings and SOFC gas turbine hybrid systems of high efficiency for distributed generation of electric power.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as set forth in the appended claims.

What is claimed is:

1. A solid oxide fuel cell stack formed of repeating cell units, each cell unit comprising:
   a plurality of solid oxide fuel cells having an anode side and a cathode side;
   an anode side frame;

a cathode side frame;

a bipolar plate having an anode side interconnect adjacent to the anode side frame and a cathode side interconnect adjacent to a cathode side frame of an adjacent repeating cell unit;

a cathode side seal between the plurality of fuel cells and the cathode side frame; and an anode side seal between the plurality of fuel cells and the anode side frame, at least one of the anode side interconnect, cathode side interconnect, and anode side seal are compliant, the cathode side seal includes a substantially flat compliant member, and the anode side frame has a plurality of openings within which anode side seals and the plurality of fuel cells are positioned, and the cathode side frame and the cathode side seal include openings coinciding with the openings in the anode side frame.

2. The solid oxide fuel cell stack of claim 1, wherein the anode side interconnect and the cathode side interconnect are compliant in three dimensions.

3. The solid oxide fuel cell stack of claim 1, wherein each of the anode side interconnect, cathode side interconnect, and anode side seal are compliant.

4. The solid oxide fuel cell stack of claim 1, wherein the anode side frame and the cathode side frame define openings within which fuel cells are held.

5. The solid oxide fuel cell stack of claim 4, wherein the openings have a size of at least about 4 inches by 4 inches.

6. The solid oxide fuel cell stack of claim 4, wherein the openings have a size of at least about 8 inches by 8 inches.

7. The solid oxide fuel cell stack of claim 1, wherein each opening in the anode side frame has a groove formed on an anode facing side, and wherein the fuel cell is seated in the groove on top of the anode side seal which is a compliant seal positioned in the groove.

8. A solid oxide fuel cell stack formed of repeating cell units, each cell unit comprising:

a plurality of solid oxide fuel cells having an anode side and a cathode side;

an anode side frame;

a cathode side frame;

a bipolar plate having an anode side interconnect adjacent to the anode side frame and a cathode side interconnect adjacent to a cathode side frame of an adjacent repeating cell unit;

a cathode side seal between the plurality of fuel cells and the cathode side frame; and an anode side seal between the plurality of fuel cells and the anode side frame, the cathode side seal incudes a substantially flat compliant member, the cathode side frame has a plurality of openings within which the plurality of fuel cells are positioned, and the anode side frame and anode side seal include openings coinciding with the opening in the cathode side frame.

9. The solid oxide fuel cell stack of claim 8, wherein the anode side frame and the cathode side frame further include slots for allowing flow of reactants to the fuel cells.

10. The solid oxide fuel cell stack of claim 9, wherein the anode side frame and the cathode side frame have openings within which fuel cell elements are positioned, and wherein the slots are positioned around the openings.

11. The solid oxide fuel cell stack of claim 8, further comprising cooling fluid channels in the anode side frame and the cathode side frame.

12. The solid oxide fuel cell stack of claim 11, wherein the fuel cell stack is adapted to carry out endothermic processes in the cooling fluid channels.

13. The solid oxide fuel cell stack of claim 1, wherein the cathode side seal includes a floating seal.

14. The solid oxide fuel cell stack of claim 1, wherein the anode side seal includes a floating seal.

15. A solid oxide fuel cell stack formed of repeating cell units, each cell unit comprising:

a solid oxide fuel cell having an anode side and a cathode side;

an anode side frame;

a cathode side frame;

a bipolar plate having an anode side interconnect adjacent to the anode side frame and a cathode side interconnect adjacent to a cathode side frame of an adjacent repeating cell unit;

a cathode side seal between the fuel cell and the cathode side frame; and an anode side seal between the fuel cell and the anode side frame, at least one pair of the anode side interconnect and anode side seal, and cathode side interconnect and cathode side seal are compliant, and the anode side frame has a plurality of openings within which anode side seals and fuel cells are positioned, and the cathode side frame and the cathode side seal include openings coinciding with the openings in the anode side frame.

16. The solid oxide fuel cell stack of claim 15, wherein the anode side frame has one separate fuel cell positioned in each opening.

17. The solid oxide fuel cell stack of claim 15, wherein the anode side frame has a number of openings and a number of fuel cells positioned in those openings.

18. The solid oxide fuel cell stack of claim 11, wherein the anode side frame comprises an outer edge and internal frame structure defining the plurality of openings, and wherein at least some of the cooling fluid channels are defined along the internal frame structure.

19. A solid oxide fuel cell stack formed of repeating cell units, each cell unit comprising:

a plurality of solid oxide fuel cells each having an anode side and a cathode side;

an anode side frame having a plurality of openings;

a cathode side frame having a plurality of openings;

wherein the plurality of fuel cells are positioned between the anode side frame and the cathode side frame with one fuel cell of the plurality of fuel cells in each opening of the plurality of openings in the anode side frame and the cathode side frame;

a cathode side seal between the plurality of fuel cells and the cathode side frame, the cathode side seal comprising a substantially flat member having openings corresponding to the openings in the cathode side frame;

a plurality of anode side seals between the plurality of fuel cells and the anode side frame and positioned in each of the openings of the anode side frame;

wherein each fuel cell of the plurality of fuel cells is sealed between the cathode side seal and one of the plurality of anode side seals; and a bipolar plate having an anode side interconnect adjacent to the anode side frame and contacting the plurality of fuel cells through the plurality of openings in the anode side frame, and having a cathode side interconnect adjacent to a cathode side frame of an adjacent repeating cell unit.

20. The solid oxide fuel cell stack of claim 19, wherein the cathode side seal includes a floating seal.

* * * * *